(12) United States Patent
Jiao

(10) Patent No.: US 12,104,431 B2
(45) Date of Patent: Oct. 1, 2024

(54) COMPOSITE ALUMINUM ALLOY PROFILE AND PREPARATION METHOD THEREFOR

(71) Applicant: GUANGDONG XIN MING GE ARCHITECTURAL MATERIALS TECHNOLOGY CO. LTD, Guangdong (CN)

(72) Inventor: Zhenqing Jiao, Taiyuan (CN)

(73) Assignee: GUANGDONG XIN MING GE ARCHITECTURAL MATERIALS TECHOLOGY, CO., LTD., Guangdong (CN)

( * ) Notice: Subject to any disclaimer, the term of this patent is extended or adjusted under 35 U.S.C. 154(b) by 358 days.

(21) Appl. No.: 17/617,096

(22) PCT Filed: May 20, 2020

(86) PCT No.: PCT/CN2020/091390
§ 371 (c)(1),
(2) Date: Dec. 7, 2021

(87) PCT Pub. No.: WO2020/259142
PCT Pub. Date: Dec. 30, 2020

(65) Prior Publication Data
US 2022/0228423 A1    Jul. 21, 2022

(30) Foreign Application Priority Data
Jun. 28, 2019   (CN) .......................... 201910577807.4

(51) Int. Cl.
E06B 3/263    (2006.01)
C08J 5/04    (2006.01)
(Continued)

(52) U.S. Cl.
CPC .......... *E06B 3/26303* (2013.01); *C08J 5/043* (2013.01); *E06B 1/325* (2013.01); *E06B 3/305* (2013.01); *C08J 2375/08* (2013.01)

(58) Field of Classification Search
CPC .......................... C08G 18/48; C08G 18/4804; C08G 18/6677; C08G 18/7614; C08G 18/7664;
(Continued)

(56) References Cited

U.S. PATENT DOCUMENTS 5,379,518 A * 1/1995 Hopper ................. E06B 3/5857
29/415
9,441,412 B1 * 9/2016 Hooper, Jr. ........... E06B 3/5821
(Continued)

FOREIGN PATENT DOCUMENTS

CN      1510242 A      7/2004
CN   201258658 Y *   6/2009
(Continued)

OTHER PUBLICATIONS

International Search Report mailed Aug. 12, 2020 for PCT/CN2020/091390.
(Continued)

*Primary Examiner* — James M Ference
(74) *Attorney, Agent, or Firm* — Billion & Armitage

(57) ABSTRACT

A composite aluminum alloy profile and a preparation method therefor. The composite aluminum alloy profile includes an outer decorative profile, a polyurethane elastomer structural adhesive, and an inner frame profile. The inner frame profile is an integral component of alkali-free glass fibers and polyurethane resin formed by one-time extrusion, and the inner frame profile comprises one upper closed cavity and one lower closed cavity for a total of two cavities and a reinforced heat insulation rib plate between the upper closed cavity and the lower closed cavity; and the (Continued)

outer decorative profile is connected to the inner frame profile through the polyurethane elastomer structural adhesive. The preparation method includes: preparing glass fibers and polyurethane materials of components A and B into a glass fiber resin reinforced profile by a compound strip-threading and injection machine, adhering the inner frame profile to the outer decorative profile through the polyurethane elastomer structural adhesive, and rolling the same. The profile has the features of heat and sound insulation and is easy to produce.

8 Claims, 4 Drawing Sheets

(51) Int. Cl.
  *E06B 1/32* (2006.01)
  *E06B 3/30* (2006.01)

(58) Field of Classification Search
  CPC ... C08G 18/7671; C08J 5/043; C08J 2375/08; C08K 3/22; C08K 3/34; C08K 3/346; C08K 5/053; C08K 5/101; C08K 5/132; C08K 7/14; C08K 13/04; C08K 2003/2227; C08L 75/04; C08L 75/08; C09J 175/04; C09J 175/08; E06B 1/325; E06B 3/22; E06B 3/26; E06B 3/26303; E06B 3/305; E06B 3/306; E06B 2003/26309; Y02A 30/00; Y02B 30/90
  USPC ......................................................... 52/404.1
  See application file for complete search history.

(56) References Cited

U.S. PATENT DOCUMENTS

| | | | | |
|---|---|---|---|---|
| 2011/0225893 | A1* | 9/2011 | Neukirchner | E06B 3/221 49/504 |
| 2011/0318094 | A1* | 12/2011 | Hensley | E06B 3/277 403/291 |
| 2022/0228423 | A1* | 7/2022 | Jiao | C08L 75/08 |

FOREIGN PATENT DOCUMENTS

| | | | | |
|---|---|---|---|---|
| CN | 102031914 | A | * | 4/2011 |
| CN | 201794434 | U | * | 4/2011 |
| CN | 203050365 | U | * | 7/2013 |
| CN | 103628772 | A | | 3/2014 |
| CN | 103790475 | A | | 5/2014 |
| CN | 103967389 | A | * | 8/2014 |
| CN | 104100173 | A | * | 10/2014 |
| CN | 105713165 | A | | 6/2016 |
| CN | 107313685 | A | * | 11/2017 |
| CN | 109025663 | A | | 12/2018 |
| CN | 110094137 | A | | 8/2019 |
| CN | 110185369 | A | | 8/2019 |
| EP | 2236720 | A1 | | 10/2010 |
| FR | 3005091 | A1 | | 10/2014 |
| WO | 2011154300 | A2 | | 12/2011 |

OTHER PUBLICATIONS

Translation of International Search Report mailed Aug. 12, 2020 for PCT/CN2020/091390.
Translation of Written Opinion mailed Aug. 12, 2020 for PCT/CN2020/091390.

* cited by examiner

COMPOSITE ALUMINUM ALLOY PROFILE AND PREPARATION METHOD THEREFOR

TECHNICAL FIELD

The present disclosure relates to a composite aluminum alloy profile and a preparation method therefor, and belongs to the technical field of building door and window and curtain wall profiles.

BACKGROUND

With the increasing improvement of people's living standards, the requirements of building environmental protection and energy saving in China are correspondingly increased, and green building technologies and new materials are widely applied. A large daylighting area is required for doors and windows of green buildings, and meanwhile, the doors and windows are required to have a lower heat transfer coefficient and a higher sealing performance Therefore, bridge-cutoff aluminum alloy doors and windows come into being and are widely applied. Bridge-cutoff aluminum alloy is aluminum alloy broken in the middle, and plastic is used as a cutoff bridge to connect the broken aluminum alloy into a whole. We know that the heat conduction of a plastic material is obviously slower than that of metal, so that heat is not easy to be transmitted through the whole material, and a heat insulation performance of frames of the doors and windows becomes better. A bridge-cutoff aluminum alloy profile separates two layers of indoor and outdoor aluminum alloy profiles and closely connects the same into a whole with a plastic profile, and constitutes a new heat insulation aluminum alloy profile.

An existing bridge-cutoff aluminum alloy profile has two nylon 66 heat insulation strip profiles penetrating through the middle of the aluminum alloy profile, and the aluminum alloy profile is divided into an inner part and an outer part by the two heat insulation strip profiles, so that partial heat conduction of the aluminum alloy is blocked. However, a structure of the existing bridge-cutoff aluminum alloy profile only blocks partial heat conduction in an aluminum alloy metal body, without a fireproof performance, while the use of a glass fiber resin profile has good heat insulation and flame-retardant performances. When the existing bridge-cutoff aluminum alloy profile is produced, the aluminum alloy profile is mechanically clamped with the heat insulation strip profile tightly. During the use of bridge-cutoff aluminum alloy doors and windows assembled in this way, a gap is generated at a joint between the aluminum alloy profile and the heat insulation strip profile due to thermal expansion and cold contraction of the aluminum alloy profile and the heat insulation strip profile, which reduces a mechanical connection strength, and is easy to lead to water seepage and air leakage, with a poor waterproof performance and a poor air sealing performance.

SUMMARY

The present disclosure overcomes the defects in the existing technology above, and provides a composite aluminum alloy profile and a preparation method thereof. The profile has a high mechanical connection strength, convenient and quick production and assembly operations, a lower heat conduction coefficient, a higher sealing performance and a reliable flame-retardant performance, and is easy to produce and low in production cost.

The present disclosure is realized by the following technical solutions.

A composite aluminum alloy profile includes an outer decorative profile in an external portion, a polyurethane elastomer structural adhesive, and an inner frame profile in an internal portion, wherein the outer decorative profile is connected to an outside of the inner frame profile through the polyurethane elastomer structural adhesive;

the inner frame profile is a continuous glass fiber resin reinforced profile and is an integral component of alkali-free glass fibers and polyurethane resin formed by one-time extrusion, a cross section of the inner frame profile is symmetrically arranged up and down and left and right, with a hollow interior, and the inner frame profile includes one upper closed cavity and one lower closed cavity for a total of two cavities and a reinforced heat insulation rib plate between the upper closed cavity and the lower closed cavity, left and right sides of outer walls at upper and lower ends of the inner frame profile are symmetrically provided with embedding grooves and adhering bumps for embedding, and left and right outer walls of the inner frame profile are symmetrically provided with T-shaped mounting strips;

a center between upper and lower outer walls of the inner frame profile is provided with a clamping recess;

the outer decorative profile is an aluminum alloy decorative panel, an inside face of the outer decorative profile is symmetrically provided with two left and right connecting clamps for embedding, a center of the outer decorative profile is provided with a clamping protrusion matched with a position and a shape of the clamping recess and a plurality of adhering protrusions for embedding, left and right sides of the outer decorative profile are internally provided with short flanges, a top portion of the connecting clamp for embedding is provided with an embedding block, the embedding block is matched with a shape of the embedding groove, and the embedding block is embedded in the embedding groove;

two faces of the inner frame profile are assembled with the outer decorative profile, an adhering gap is arranged between the outer decorative profile and the inner frame profile, and the polyurethane elastomer structural adhesive is arranged in the adhering gap;

the inner frame profile includes 70% to 85% by weight of alkali-free glass fibers and 15% to 30% by weight of polyurethane resin; and the polyurethane elastomer structural adhesive is mixed with a polyether polyol mixture and a diphenylmethane diisocyanate-based mixture.

An outer surface of the outer decorative profile may also be connected to a natural wood or an artificial decorative surface material through a screw, a hole is drilled in the outer wall of the outer decorative profile, one end of the screw is clamped with the surface material, and the other end of the screw is inserted into the outer decorative profile and the inner frame profile by rotation, so that the surface material is mounted on the outer surface of the outer decorative profile. The outer decorative profile is simple and convenient to mount, has a high connection strength, and can meet different requirements.

The two faces of the inner frame profile are assembled with the outer decorative profile by the following method.

A top portion of the clamping protrusion is in close contact with the clamping recess, a top portion of the embedding block is in close contact with the embedding groove, an adhering groove for embedding is in close contact with the adhering bump for embedding by embedding, an adhering gap is formed between the inside face of the outer decorative profile and the adhering bump for embedding, and the polyurethane elastomer structural adhesive is arranged in the adhering gap.

The polyurethane resin includes a component A and a component B, the component A includes: a base material A and an additive A in a mass ratio of 100:4 to 8, and the base material A is prepared from 70 parts to 80 parts of polymethylene polyphenylene isocyanate with a purity of 100%, 10 parts to 20 parts of diphenylmethane and 5 parts to 10 parts of 4,4-diisocyanate with a purity of 38% to 50%; the additive A is L-ethyl lactate; and the component B includes: 40 parts to 60 parts by weight of polyether polyol, 28 parts to 40 parts by weight of polypropylene glycol and an additive B, and the additive B is one or a combination of more of a filler, a flame retardant, a pigment paste, a diluent or an ultraviolet absorber.

A weight ratio of the component A to the component B is 100:110 to 120.

The additive B includes 1 part to 3 parts by weight of glycerol, 2 parts to 4 parts by weight of flame retardant, 3 parts to 5 parts by weight of ultraviolet absorber, 2 parts to 5 parts by weight of pigment paste, and the filler.

The flame retardant is aluminum hydroxide, the ultraviolet absorber is 2,4-dihydroxybenzophenone, and the filler is kaolin or talc.

A preparation method for the composite aluminum alloy profile includes:

1): respectively preparing and forming the outer decorative profile and the inner frame profile by an extrusion process;

wherein a preparation method for the inner frame profile includes the following steps of:

firstly, penetrating a continuous glass fiber into a mold of a compound strip-threading and injection machine;

secondly, evenly mixing raw materials of the component A and raw materials of the component B respectively, and adding the component A and the component B into an injection tank A and an injection tank B of the compound strip-threading and injection machine respectively; and finally, injecting the component A and the component B into the mold in proportion by the compound strip-threading and injection machine to produce the glass fiber resin reinforced profile;

2): loading the inner frame profile into a material storage of a pneumatic clamping machine, horizontally placing the outer decorative profile, and evenly injecting a proper amount of polyurethane adhesive between the two left and right connecting clamps for embedding;

3): allowing the inner frame profile at a lowest layer of the material storage of the pneumatic clamping machine to fall down and combine with the outer decorative profile after injection in 2), and inserting a bottom portion of the inner frame profile between the two connecting clamps for embedding;

4): moving the inner frame profile downwardly, so that the adhering protrusion for embedding is in close contact with a bottom face of the inner frame profile, forming an adhering gap between an inner side of the outer decorative profile and a lower outer wall of the inner frame profile, forming an adhering gap between inside faces of the two connecting clamps for embedding of the outer decorative profile and the adhering bump for embedding at the same time, and filling the polyurethane elastomer structural adhesive into the adhering gaps, so that the adhering bump for embedding is in contact with the polyurethane adhesive;

5): rolling the inner frame profile and the outer decorative profile inwardly by using two upper and lower pressing rollers of a bridge-cutoff aluminum compound machine, so that a vertex of the embedding block is in close contact with the embedding groove, the top portion of the clamping protrusion is embedded and tightly clamped with the clamping recess, and the polyurethane adhesive is evenly filled into the two adhering gaps; and 6): repeatedly operating steps 2) to 5), mounting the outer decorative profile on the other face of the inner frame profile, so that two upper and lower faces of the inner frame profile are both provided with the outer decorative profile, and completing assembly of door and window profile assemblies made of the composite material.

During the preparation of the inner frame profile, a temperature of a workshop is required to be 18° C. to 35° C., a temperature of the injection tank is set to be 20° C. to 30° C., and an environment relative humidity is below 80%.

Compared with the existing technology, the present disclosure has the following beneficial effects:

The aluminum alloy profile of the present disclosure is simple in structure, simple and effective in composite assembly method, and convenient and quick in production operation on a premise of ensuring a high mechanical connection strength, does not need a complicated assembly process, is suitable for assembling the polyurethane adhesive which is easy to dry, has a high assembly efficiency, requires less participation of workers, and greatly reduces a production cost.

The two closed cavities of the continuous glass fiber reinforced profile can effectively block heat conduction and realize good sound insulation, and with a low heat transfer coefficient and a high sealing performance, the continuous glass fiber reinforced profile can effectively block heat conduction in the aluminum alloy profile and heat convection, and reduce a heat conductivity of the aluminum alloy profile, thus improving heat insulation, noise and sound insulation, and fire prevention and flame-retardant functions of the aluminum alloy profile. The present disclosure is easy to produce and low in production cost.

Figure 1:
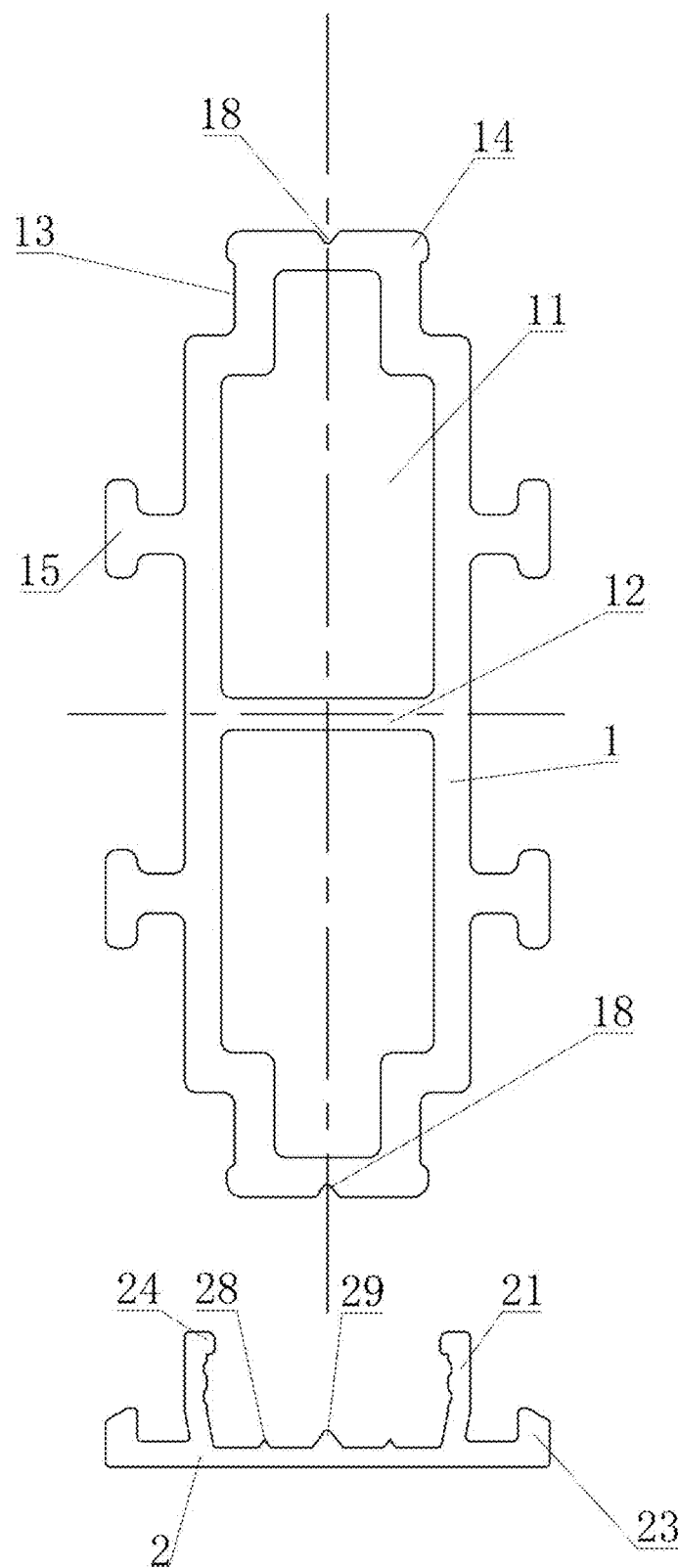
FIG. 1 is a schematic structural diagram of the present disclosure in an exploded state.
Figure 2:
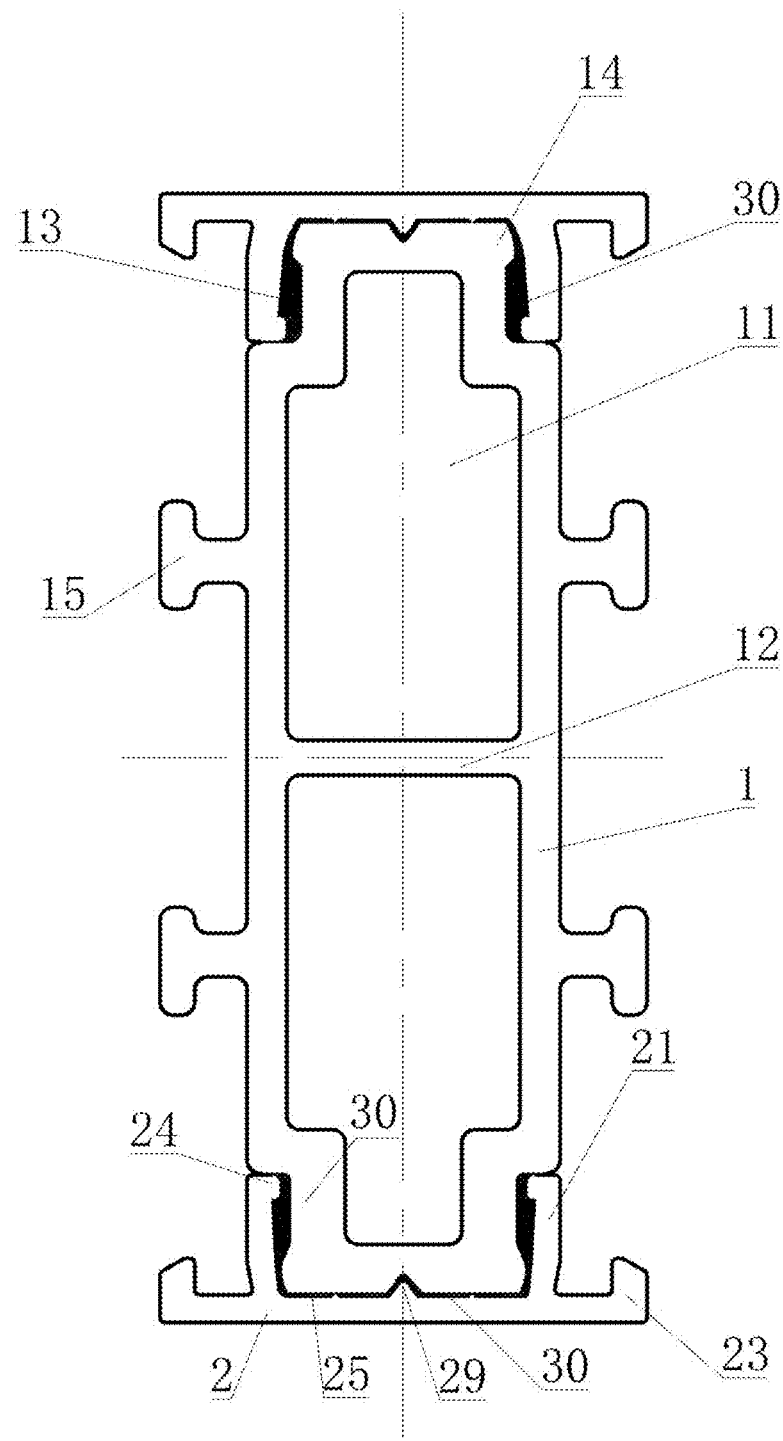
FIG. 2 is a schematic structural diagram of the present disclosure in an assembled state.
Figure 3:
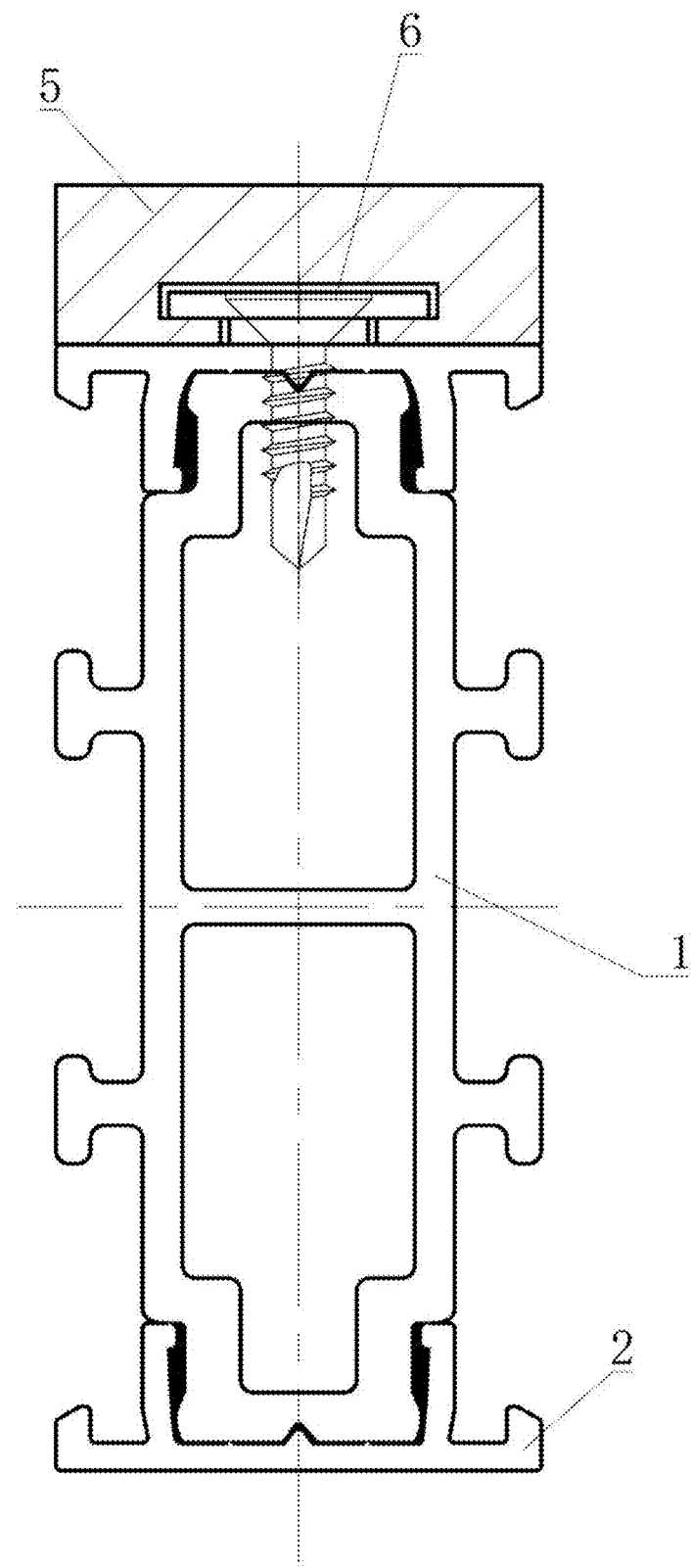
FIG. 3 is a schematic structural diagram of a surface material of the present disclosure.
Figure 4:
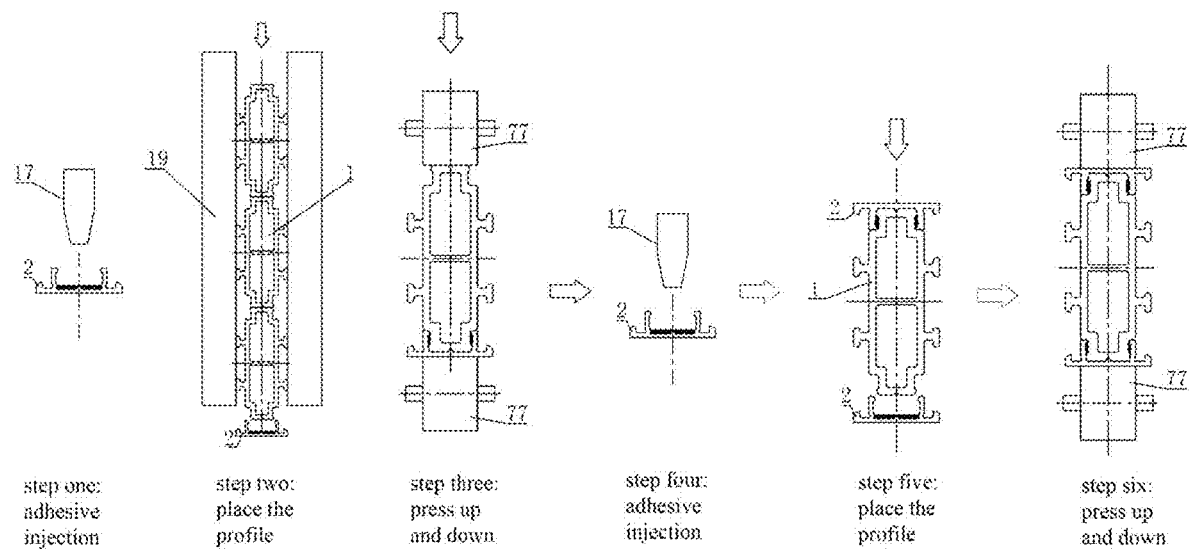
FIG. 4 is an assembly flow chart of a preparation process of a composite aluminum alloy profile of the present disclosure.
Figure 5:
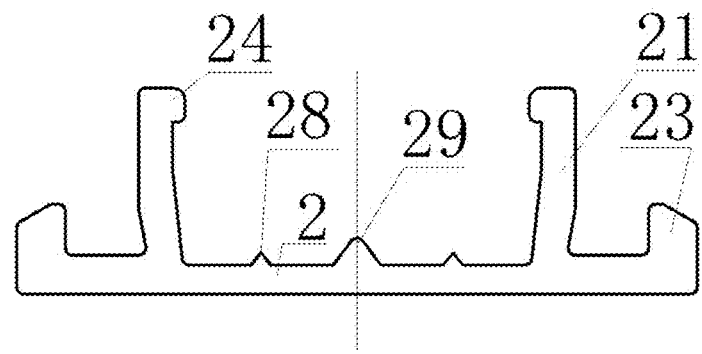
FIG. 5 is a schematic structural diagram of an outer decorative profile of the present disclosure.

In the drawings, 1 refers to inner frame profile, 2 refers to outer decorative profile, 5 refers to surface material, 6 refers to screw, 11 refers to closed cavity, 12 reinforced heat insulation rib plate, 13 refers to embedding groove, 14 refers to adhering bump for embedding, 15 refers to T-shaped mounting strip, 17 refers to compound strip-threading and injection machine, 18 refers to clamping recess, 19 refers to material storage of pneumatic clamping machine, 21 refer to connecting clamp for embedding, 24 refers to embedding block, 28 refers to adhering protrusion for embedding, 29 refers to clamping protrusion, 30 refers to adhering gap, and 77 refers to pressing roller of bridge-cutoff aluminum compound machine.

DETAILED DESCRIPTION

The present disclosure is further described hereinafter with reference to the embodiments and the accompanying drawings.

A composite aluminum alloy profile includes an outer decorative profile 2 in an external portion, a polyurethane elastomer structural adhesive, and an inner frame profile 1 in an internal portion, wherein the outer decorative profile 2 is connected to an outside of the inner frame profile 1 through the polyurethane elastomer.

The inner frame profile is a continuous glass fiber resin reinforced profile and is an integral component of alkali-free glass fibers and polyurethane resin formed by one-time extrusion, a cross section of the inner frame profile is symmetrically arranged up and down and left and right, with a hollow interior, and the inner frame profile includes one upper closed cavity 11 and one lower closed cavities cavity 11 for a total of two cavities and a reinforced heat insulation rib plate in the middle. Left and right sides of outer walls at upper and lower ends of the inner frame profile 1 are symmetrically provided with embedding grooves 13 and adhering bumps for embedding 14, and left and right outer walls of the inner frame profile 1 are symmetrically provided with T-shaped mounting strips 15. A center between upper and lower outer walls of the inner frame profile 1 is provided with a clamping recess 18.

The outer decorative profile 2 is an aluminum alloy decorative panel, an inside face of the outer decorative profile 2 is symmetrically provided with two left and right connecting clamps for embedding 21, and a center of the outer decorative profile is provided with a clamping protrusion 29 matched with a position and a shape of the clamping recess 18. Left and right sides of the outer decorative profile are internally provided with short flanges 23, the inside face of the outer decorative profile 2 is also provided with a plurality of adhering protrusions for embedding 28, a top portion is provided with an embedding block 24, the embedding block 24 is matched with a shape of the embedding groove 13, and the embedding block 24 is embedded in the embedding groove 13. The embedding block is a rectangle or a triangle.

Two faces of the inner frame profile 1 are assembled with the outer decorative profile 2, and an adhering gap 30 is arranged between the outer decorative profile and the inner frame profile. The two faces of the inner frame profile are assembled with the outer decorative profile by the following method.

A top portion of the clamping protrusion 29 is in close contact with the clamping recess 18, a top portion of the embedding block 24 is in close contact with the embedding groove 13, and the adhering protrusion for embedding 28 is in close contact with a bottom face of the inner frame profile. An adhering gap 30 is formed between an inner side of the outer decorative profile and two upper and lower outer walls of the inner frame profile, and an adhering gap 30 is formed between inside faces of the two connecting clamps for embedding 21 of the outer decorative profile 2 and the adhering bump for embedding 14. The polyurethane elastomer structural adhesive is arranged in the adhering gaps 30.

An outer surface of the outer decorative profile may also be connected to a natural wood or an artificial decorative surface material 5 through a screw 6, and a hole is drilled in the outer wall of the outer decorative profile. One end of the screw is clamped with the surface material, and the other end of the screw is inserted into the outer decorative profile and the inner frame profile by rotation, so that the surface material is mounted on the outer surface of the outer decorative profile. The outer decorative profile is simple and convenient to mount, has a high connection strength, and can meet different requirements.

In a structure of the profile, the polyurethane elastomer structural adhesive is arranged in the adhering gaps for overcoming a difference in expansion coefficient between the aluminum alloy panel and the continuous glass fiber reinforced profile, which can increase an airtightness and a watertightness of the profile, and solve a problem that a mechanical property of the profile and different expansion coefficients between materials cannot be guaranteed after different materials are compounded.

Assembly Method:

As shown in FIG. 9, a preparation method for the composite profile in a structure embodiment 2 includes the following steps.

In step 1, the outer decorative profile and the inner frame profile are respectively prepared and formed by an extrusion process.

The preparation and forming of the outer decorative profile are carried out by a compound strip-threading and injection machine 17, which can realize tooth punching for an aluminum material, double notch injection, rolling and feeding in place of the continuous glass fiber resin reinforced profile and the aluminum material, and other machining operations. After initial setting for 20 minutes, the structural adhesive is transferred to a bridge-cutoff aluminum compound machine for compounding.

A preparation method for the inner frame profile includes the following steps of:

1) penetrating a continuous glass fiber into a mold of a compound strip-threading and injection machine;

2) evenly mixing raw materials of the component A and raw materials of the component B respectively, and adding the component A and the component B into an injection tank A and an injection tank B of the injection machine respectively; and 3) injecting the component A and the component B into the mold in proportion by the injection machine to produce the glass fiber resin reinforced profile. A weight ratio of the component A to the component B is 100:110 to 120.

The mixed polyurethane resin is injected and infiltrated into a cavity of the mold in vacuum by the injection machine, and solidified and formed at a certain temperature for a certain period time to form the continuous glass fiber resin reinforced profile. The continuous glass fiber resin reinforced profile is alternately and continuously pulled by two pulling heads arranged on a pultrusion production line, and after reaching a set length, the continuous glass fiber resin reinforced profile is cut off by a cutting saw, so that subsequent operations may be carried out.

During the preparation of the inner frame profile, a temperature of a workshop is required to be 18° C. to 35° C., a temperature of the injection tank is set to be 20° C. to 30° C., and an environment relative humidity is below 80%.

In step 2, the inner frame profile 1 is loaded into a material storage 19 of a pneumatic clamping machine, the outer decorative profile 2 is horizontally placed, and a proper amount of polyurethane adhesive is evenly injected between the two left and right connecting clamps for embedding 21.

In step 3, the inner frame profile 1 at a lowest layer of the material storage 19 of the pneumatic clamping machine is allowed to fall down and combine with the outer decorative profile after injection in step 2), and a bottom portion of the inner frame profile is inserted between the two connecting clamps for embedding 21.

In step 4, the inner frame profile 1 moves downwardly, so that the top portion of the clamping protrusion 29 is embedded and clamped with the clamping recess 18, and the adhering protrusion for embedding 28 is in close contact with a bottom face of the inner frame profile. An adhering gap is formed between an inner side of the outer decorative profile and a lower outer wall of the inner frame profile, and an adhering gap 30 is formed between inside faces of the two connecting clamps for embedding 21 of the outer decorative profile 2 and the adhering bump for embedding 14 at the same time. The polyurethane elastomer structural adhesive is filled into the adhering gaps, so that the adhering bump for embedding 14 is in contact with the polyurethane adhesive.

In step 5, the inner frame profile and the outer decorative profile are rolled inwardly by using two upper and lower pressing rollers 77 of a bridge-cutoff aluminum compound machine, so that a vertex of the embedding block 24 is in close contact with the embedding groove 13, the top portion of the clamping protrusion 29 is embedded and clamped with the clamping recess 18, and the polyurethane adhesive is evenly filled into the two adhering gaps.

In step 6, steps 2) to 5) are repeatedly operated, the outer decorative profile is mounted on the other face of the inner frame profile, so that two upper and lower faces of the inner frame profile are both provided with the outer decorative profile, and assembly of door and window profile assemblies made of the composite material is completed.

The inner frame profile includes 70% to 85% by weight of alkali-free glass fibers and 15% to 30% by weight of polyurethane resin. The polyurethane resin is one of polyurethane resin, unsaturated resin, phenolic resin, epoxy resin and polypropylene resin.

The polyurethane elastomer structural adhesive is mixed with the following two components:

a first component, which is a polyether polyol mixture (—OH component), with a hydroxyl value above 30 mgKOH/g, a functionality of 3 to 5, and a dynamic viscosity of 1,000 mpa to 3,000 mpa at 25° C.; and a second component, which is a diphenylmethane diisocyanate-based mixture (—NCO component).

A preparation method for the polyurethane elastomer structural adhesive includes the following steps.

The first and second components are mixed by a special device according to a ratio of 100:88±3 at a stirring speed of 3,500 rpm to 4,000 rpm during production. The polyurethane elastomer structural adhesive shall be realized by using a mixing device having two storage tanks (the storage tanks are provided with stirring devices) and automatically adjusting a mixing ratio, and a compound strip-threading and injection machine with two stirring heads.

The polyurethane resin includes a component A and a component B.

The component A includes: a base material A and an additive A in a mass ratio of 100:4 to 8. The base material A is prepared from 70 parts to 80 parts of polymethylene polyphenylene isocyanate with a purity of 100%, 10 parts to 20 parts of diphenylmethane and 5 parts to 10 parts of 4,4-diisocyanate with a purity of 38% to 50%; and the additive A is L-ethyl lactate.

The component B includes: 40 parts to 60 parts by weight of polyether polyol, 28 parts to 40 parts by weight of polypropylene glycol and an additive B. The additive B is one or a combination of more of a filler, a flame retardant, a pigment paste, a diluent or an ultraviolet absorber.

The additive B includes 1 part to 3 parts by weight of glycerol, 2 parts to 4 parts by weight of flame retardant, 3 parts to 5 parts by weight of ultraviolet absorber, 2 parts to 5 parts by weight of pigment paste, and the filler.

The flame retardant is aluminum hydroxide, the ultraviolet absorber is 2,4-dihydroxybenzophenone, and the filler is kaolin or talc.

Embodiment One

A composite aluminum alloy profile includes an outer decorative profile 2 in an external portion, a polyurethane elastomer structural adhesive and an inner frame profile 1 in an internal portion.

The inner frame profile includes 70% by weight of alkali-free glass fibers and 30% by weight of polyurethane resin.

The polyurethane resin includes a component A and a component B, and a weight ratio of the component A to the component B is 100:110.

The component A includes: a base material A and an additive A in a mass ratio of 100:4, and the base material A is prepared from 70 parts of polymethylene polyphenylene isocyanate with a purity of 100%, 20 parts of diphenylmethane and 10 parts of 4,4-diisocyanate with a purity of 38% to 50%; and the additive A is L-ethyl lactate.

The component B includes: 40 parts by weight of polyether polyol, 40 parts by weight of polypropylene glycol, 3 parts by weight of glycerol, 4 parts by weight of flame retardant, 5 parts by weight of ultraviolet absorber, 5 parts by weight of pigment paste and 3 parts by weight of kaolin filler.

The flame retardant is aluminum hydroxide, and the ultraviolet absorber is 2,4-dihydroxybenzophenone.

The polyurethane elastomer structural adhesive is mixed with first and second components in a mass ratio of 100:88, the first component is a polyether polyol mixture (—OH component) and the second component is a diphenylmethane diisocyanate-based mixture (—NCO component).

Embodiment Two

A composite aluminum alloy profile includes an outer decorative profile 2 in an external portion, a polyurethane elastomer structural adhesive and an inner frame profile 1 in an internal portion. The inner frame profile includes 85% by weight of alkali-free glass fibers and 15% by weight of polyurethane resin.

The polyurethane resin includes a component A and a component B, and a weight ratio of the component A to the component B is 100:120.

The component A includes a base material A and an additive A at a mass ratio of 100:8, and the base material A is prepared from 80 parts of polymethylene polyphenylene isocyanate with a purity of 100%, 15 parts of diphenylmethane and 5 parts of 4,4-diisocyanate with a purity of 38% to 50%; and the additive A is L-ethyl lactate.

The component B includes: 60 parts by weight of polyether polyol, 28 parts by weight of polypropylene glycol, 1 part by weight of glycerol, 2 parts by weight of flame retardant, 3 parts by weight of ultraviolet absorber, 2 parts by weight of pigment paste and 4 parts by weight of filler.

The flame retardant is aluminum hydroxide, the ultraviolet absorber is 2,4-dihydroxybenzophenone, and the filler is talc.

The polyurethane elastomer structural adhesive is mixed with first and second components in a mass ratio of 100:85, the first component is a polyether polyol mixture (—OH component) and the second component is a diphenylmethane diisocyanate-based mixture (—NCO component).

Embodiment Three

A composite aluminum alloy profile includes an outer decorative profile 2 in an external portion, a polyurethane elastomer structural adhesive and an inner frame profile 1 in an internal portion.

The inner frame profile includes 75% by weight of alkali-free glass fibers and 25% by weight of polyurethane resin.

The polyurethane resin includes a component A and a component B, and a weight ratio of the component A to the component B is 100:112.

The component A includes: a base material A and an additive A in a mass ratio of 100:6, and the base material A is prepared from 75 parts of polymethylene polyphenylene isocyanate with a purity of 100%, 17 parts of diphenylmethane and 8 parts of 4,4-diisocyanate with a purity of 38% to 50%; and the additive A is L-ethyl lactate.

The component B includes: 45 parts by weight of polyether polyol, 38 parts by weight of polypropylene glycol, 2 parts by weight of glycerol, 3 parts by weight of flame retardant, 4 parts by weight of ultraviolet absorber, 4 parts by weight of pigment paste and 4 parts by weight of filler.

The flame retardant is aluminum hydroxide, the ultraviolet absorber is 2,4-dihydroxybenzophenone, and the filler is kaolin.

The polyurethane elastomer structural adhesive is mixed with first and second components in a mass ratio of 100:91, the first component is a polyether polyol mixture (—OH component) and the second component is a diphenylmethane diisocyanate-based mixture (—NCO component).

Embodiment Four

A composite aluminum alloy profile includes an outer decorative profile 2 in an external portion, a polyurethane elastomer structural adhesive and an inner frame profile 1 in an internal portion.

The inner frame profile includes 80% by weight of alkali-free glass fibers and 20% by weight of polyurethane resin.

The polyurethane resin includes a component A and a component B, and a weight ratio of the component A to the component B is 100:115.

The component A includes: a base material A and an additive A in a mass ratio of 100:5, and the base material A is prepared from 77 parts of polymethylene polyphenylene isocyanate with a purity of 100%, 17 parts of diphenylmethane and 6 parts of 4,4-diisocyanate with a purity of 38% to 50%; and the additive A is L-ethyl lactate.

The component B includes: 50 parts by weight of polyether polyol, 40 parts by weight of polypropylene glycol, 1 part by weight of glycerol, 4 parts by weight of flame retardant, and 5 parts by weight of ultraviolet absorber.

The flame retardant is aluminum hydroxide, and the ultraviolet absorber is 2,4-dihydroxybenzophenone.

The polyurethane elastomer structural adhesive is mixed with first and second components in a mass ratio of 100:89, the first component is a polyether polyol mixture (—OH component) and the second component is a diphenylmethane diisocyanate-based mixture (—NCO component).

Embodiment Five

A composite aluminum alloy profile includes an outer decorative profile 2 in an external portion, a polyurethane elastomer structural adhesive and an inner frame profile 1 in an internal portion.

The inner frame profile includes 75% by weight of alkali-free glass fibers and 25% by weight of polyurethane resin.

The polyurethane resin includes a component A and a component B, and a weight ratio of the component A to the component B is 100:118.

The component A includes: a base material A and an additive A in a mass ratio of 100:8, and the base material A is prepared from 80 parts of polymethylene polyphenylene isocyanate with a purity of 100%, 12 parts of diphenylmethane and 8 parts of 4,4-diisocyanate with a purity of 38% to 50%; and the additive A is L-ethyl lactate.

The component B includes: 55 parts by weight of polyether polyol, 35 parts by weight of polypropylene glycol, 3 parts by weight of glycerol, 4 parts by weight of ultraviolet absorber, and 2 parts by weight of filler.

The ultraviolet absorber is 2,4-dihydroxybenzophenone, and the filler is talc.

The polyurethane elastomer structural adhesive is mixed with first and second components in a mass ratio of 100:87, the first component is a polyether polyol mixture (—OH component) and the second component is a diphenylmethane diisocyanate-based mixture (—NCO component).

The above shows and describes the basic principle, main features and advantages of the present disclosure, and the descriptions are more specific and detailed, but cannot be understood as limiting the patent scope of the present disclosure. It should be pointed out that those of ordinary skills in the art may further make several modifications and improvements without departing from the concept of the present disclosure, and these modifications and improvements all fall within the scope of protection of the present disclosure.

What is claimed is:

1. A composite aluminum alloy profile, comprising an outer decorative profile, a polyurethane elastomer structural adhesive, and an inner frame profile, wherein the outer decorative profile is connected to an outside of the inner frame profile through the polyurethane elastomer structural adhesive;

wherein the inner frame profile is a continuous glass fiber resin reinforced profile and is an integral component of alkali-free glass fibers and polyurethane resin formed by a one-time extrusion, a cross section of the inner frame profile is symmetrically arranged up and down and left and right, with a hollow interior, and the inner frame profile comprises one upper closed cavity and one lower closed cavity for a total of two cavities and a reinforced heat insulation rib plate between the upper closed cavity and the lower closed cavity, wherein left and right sides of outer walls at upper and lower ends of the inner frame profile are symmetrically provided with embedding grooves and adhering bumps for embedding, and left and right outer walls of the inner frame profile are symmetrically provided with T-shaped mounting strips; a center between upper and lower outer walls of the inner frame profile is provided with a clamping recess;

wherein the outer decorative profile is an aluminum alloy decorative panel, an inside face of the outer decorative profile is symmetrically provided with one left connecting clamp for embedding and one right connecting clamps for embedding, a center of the outer decorative profile is provided with a clamping protrusion matched with a position and a shape of the clamping recess and a plurality of adhering protrusions for embedding, left and right sides of the outer decorative profile are internally provided with short flanges, a top portion of the connecting clamp for embedding is provided with an embedding block, the embedding block is matched with a shape of the embedding groove, and the embedding block is embedded in the embedding groove;

wherein two faces of the inner frame profile are assembled with the outer decorative profile, an adhering gap is arranged between the outer decorative profile and the inner frame profile, and the polyurethane elastomer structural adhesive is arranged in the adhering gap;

wherein the inner frame profile comprises 70% to 85% by weight of alkali-free glass fibers and 15% to 30% by weight of polyurethane resin; and wherein the polyurethane elastomer structural adhesive is mixed with a polyether polyol mixture and a diphenylmethane diisocyanate-based mixture.

2. The composite aluminum alloy profile of claim 1, wherein the two faces of the inner frame profile are assembled with the outer decorative profile by the following way: a top portion of the clamping protrusion is in contact with the clamping recess, a top portion of the embedding block is in close contact with the embedding groove, an adhering groove for embedding is in contact with the adhering bump for embedding by embedding, an adhering gap is formed between the inside face of the outer decorative profile and the adhering bump for embedding, and the polyurethane elastomer structural adhesive is arranged in the adhering gap.

3. The composite aluminum alloy profile of claim 1, wherein the polyurethane resin comprises a component A and a component B, the component A comprises: a base material A and an additive A in a mass ratio of 100: 4 to 8, and the base material A is prepared from 70 parts to 80 parts of polymethylene polyphenylene isocyanate with a purity of 100%, 10 parts to 20 parts of diphenylmethane and 5 parts to 10 parts of 4,4-diisocyanate with a purity of 38% to 50%; and the additive A is L-ethyl lactate; and the component B comprises: 40 parts to 60 parts by weight of polyether polyol, 28 parts to 40 parts by weight of polypropylene glycol and an additive B, and the additive B is one or more of a filler, a flame retardant, a pigment paste, a diluent or an ultraviolet absorber.

4. The composite aluminum alloy profile of claim 3, wherein a weight ratio of the component A to the component B is 100: 110 to 120.

5. The composite aluminum alloy profile of claim 3, wherein the additive B comprises 1 part to 3 parts by weight of glycerol, 2 parts to 4 parts by weight of flame retardant, 3 parts to 5 parts by weight of ultraviolet absorber, 2 parts to 5 parts by weight of pigment paste, and the filler.

6. The composite aluminum alloy profile of claim 5, wherein the flame retardant is aluminum hydroxide, the ultraviolet absorber is 2,4-dihydroxybenzophenone, and the filler is kaolin or talc.

7. A preparation method for the composite aluminum alloy profile of claim 1, comprising:

1): Respectively preparing and forming the outer decorative profile and the inner frame profile by an extrusion process;

wherein the inner frame profile is prepared by a method comprising:

firstly, penetrating a continuous glass fiber into a mold of a compound strip-threading and injection machine;

secondly, evenly mixing raw materials of the component A and raw materials of the component B respectively, and adding the component A and the component B into an injection tank A and an injection tank B of the compound strip-threading and injection machine respectively; and finally, injecting the component A and the component B into the mold in proportion by the compound strip-threading and injection machine to produce the glass fiber resin reinforced profile;

2): Loading the inner frame profile into a material storage of a pneumatic clamping machine, horizontally placing the outer decorative profile, and evenly injecting a polyurethane adhesive between the two left and right connecting clamps for embedding;

3): Allowing the inner frame profile at a lowest layer of the material storage of the pneumatic clamping machine to fall down and combine with the outer decorative profile after injection in 2), and inserting a bottom portion of the inner frame profile between the two connecting clamps for embedding;

4): Moving the inner frame profile downwardly, so that the top portion of the clamping protrusion is embedded and tightly clamped with the clamping recess, and the adhering protrusion for embedding is in close contact with a bottom face of the inner frame profile, forming an adhering gap between an inner side of the outer decorative profile and a lower outer wall of the inner frame profile, forming an adhering gap between inside faces of the two connecting clamps for embedding of the outer decorative profile and the adhering bump for embedding at the same time, and filling the polyurethane elastomer structural adhesive into the adhering gaps, so that the adhering bump for embedding is in contact with the polyurethane adhesive;

5): Rolling the inner frame profile and the outer decorative profile inwardly by using two upper and lower pressing rollers of a bridge-cutoff aluminum compound machine, so that a vertex of the embedding block is in close contact with the embedding groove, the top portion of the clamping protrusion is embedded and tightly clamped with the clamping recess, and the polyurethane adhesive is evenly filled into the two adhering gaps; and 6): Repeatedly operating 2) to 5), mounting the outer decorative profile on the other face of the inner frame profile, so that two upper and lower faces of the inner frame profile are both provided with the outer decorative profile, and completing assembly of door and window profile assemblies made of the composite material.

8. The preparation method for the composite aluminum alloy profile of claim 7, wherein during the preparation of the inner frame profile, a temperature of a workshop is required to be 18° C. to 35° C., a temperature of the injection tank is set to be 20° C. to 30° C., and an environment relative humidity is below 80%.

* * * * *